April 20, 1954   P. F. BECHBERGER   2,676,284
FAULT PROTECTIVE SYSTEM
Filed Sept. 13, 1950
3 Sheets-Sheet 1

INVENTOR.
PAUL F. BECHBERGER
BY James M. Mickels
ATTORNEY

April 20, 1954　　　P. F. BECHBERGER　　　2,676,284
FAULT PROTECTIVE SYSTEM
Filed Sept. 13, 1950

INVENTOR.
PAUL F. BECHBERGER
BY
ATTORNEY

April 20, 1954  P. F. BECHBERGER  2,676,284
FAULT PROTECTIVE SYSTEM
Filed Sept. 13, 1950  3 Sheets-Sheet 3

INVENTOR.
PAUL F. BECHBERGER
BY
ATTORNEY

Patented Apr. 20, 1954

2,676,284

UNITED STATES PATENT OFFICE 2,676,284

FAULT PROTECTIVE SYSTEM

Paul F. Bechberger, Tenafly, N. J., assignor to Bendix Aviation Corporation, Teterboro, N. J., a corporation of Delaware Application September 13, 1950, Serial No. 184,671

2 Claims. (Cl. 317—13)

The present invention relates to protective systems, and more particularly to protective systems for faults on generator load feeders.

In airplanes, it is highly expedient to protect the electrical system against trouble of all kinds, not only to protect the electrical equipment, but also to prevent any potential fire hazard from developing. When a power source, such as a generator, is supplying D. C. power through a line or bus to a load which varies extremely in normal operation, conventional circuit breakers placed at the transmitting end of the line will not detect or be operated by low ampere faults occurring between the power source and the load.

By utilizing saturable reactors as fault detectors, a high degree of sensitivity is obtained whereby low ampere faults will be detected even in high ampere lines.

One of the objects of the invention is to provide a sensitive fault protection for a generator system.

Another object of the invention is to provide improved means for detecting faults on a generator load lead.

Another object of the invention is to provide means for detecting faults that are small in proportion to the load.

Another object of the invention is to provide improved means for detecting faults in a feeder.

Another object of the invention is to provide an improved protective system for electrical circuits.

These and other objects and features of the invention will appear more fully hereinafter from a consideration of the following description taken in connection with the accompanying drawing wherein three embodiments of the invention are allustrated by way of example.

In the drawings.

Referring now to the drawings wherein like parts in the various figures have been assigned the same reference numerals.

Figure 1:
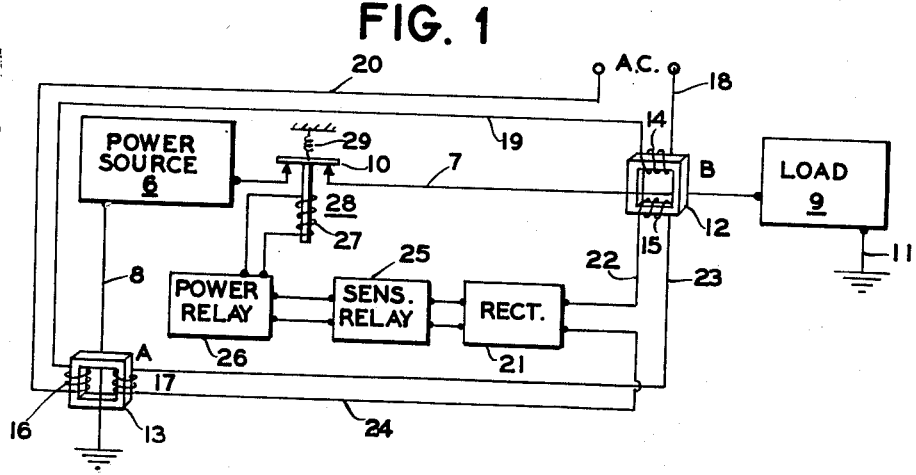
Figure 1 is a block diagram showing diagrammatically one embodiment of the invention.

In Figure 1, there is provided a source of D. C. power 6, which may be a generator, battery or any other source of D. C. power, having output lines 7 and 8. The output line 7 is connected to a load 9 through switch member 10 while the output line 8 is connected to the load 9 through ground and groundling lead 11 of the load 9. However, it is understood that the line 8 may be directly connected to the load 9 such as in an ungrounded system. An iron cored inductance 12 is placed near the load 9 and surrounds the conductor 7. A similar iron core inductance 13 is placed adjacent the grounded point and surrounds the conductor 8. The iron core of the inductances 12 and 13 may be any shape as long as it surrounds the D. C. line. The average current carried by the line will determine whether the core has an air gap (not shown) and the length of the air gap. The inductance 12 has a primary winding 14 and a secondary winding 15; the inductance 13 has a primary winding 16 and a secondary winding 17. The primary windings 14 and 16 are connected in series aiding relationship across a source of A. C. power (not shown) by conductors 18, 19 and 20. The secondaries 15 and 17 are connected in series opposing relationship across the input of a rectifier 21 by conductors 22, 23 and 24. The output of the rectifier is connected to a sensitive relay 25. Upon the output of the rectifier exceeding a predetermined value, the relay 25 affects power relay 26 in a manner to deenergize winding 27 of relay 28 permitting the switch member 10 to be actuated to an open circuit position under the bias of spring 29.

In operation, the current flowing in the secondary windings of the reactors 12 and 13 are equal and opposite under normal conditions and the balance threbetween is not affected by the amount of load. However, upon a fault occurring on the feeder, an unbalance in current flow in the feeders occurs causing the direct current in one of the feeders to exceed that in the other feeder by the amount of the fault. This increases the impedance of the primary winding of the affected reactor causing a decrease in the voltage induced in the secondary thus destroying the unbalance between the secondaries and providing an input to the rectifier, the amplitude of which depends upon the amount of current through the fault. Thus, the reactors amplify the fault current thereby providing a high degree of sensitivity.

Figure 2:
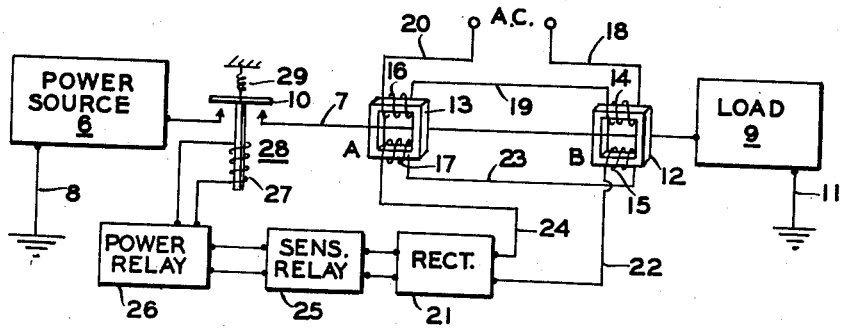
Figure 2 is a block diagram showing a modification of Figure 1.

In Figure 2, the reactor 13 is placed around the line 7 near the source of D. C. power instead of around the grounded lead as shown in Figure 1. The operation is similar to that of the arrangement of Figure 1.

Figure 3:
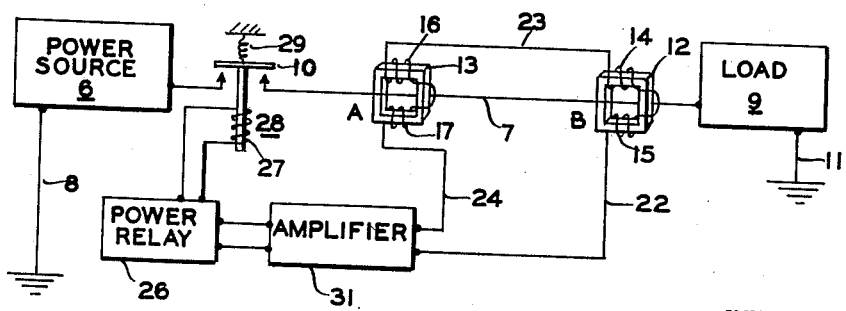
Figure 3 is a block diagram showing diagrammatically another embodiment of the invention.

In the embodiment illustrated in Figure 3, the reactor 13 is placed around the line 7 near the source and the reactor 12 is placed around the line 7 near the load and the winding 16 and the winding 17 are connected in series. The reactor 12 is placed near the load and the windings 14 and 15 are connected in series.

The inductances 12 and 13 are connected in series opposition by conductors 22, 23 and 24 across the input of amplifier 31. The windings are balanced, such as by adjusting the air gaps, so that induced voltages caused by abrupt changes in load current will cancel out. Upon the occurrence of a fault between the power source and load, the current in the line 7 at the inductance 13 is greater than the current in the line 7 at the inductance 12 by the amount of the fault current. The D. C. flux in the core of inductance 13 increases and induces a pulse of voltage in the windings 16, 17 which is amplified by the amplifier 31 to operate the relay 26.

Figure 4:
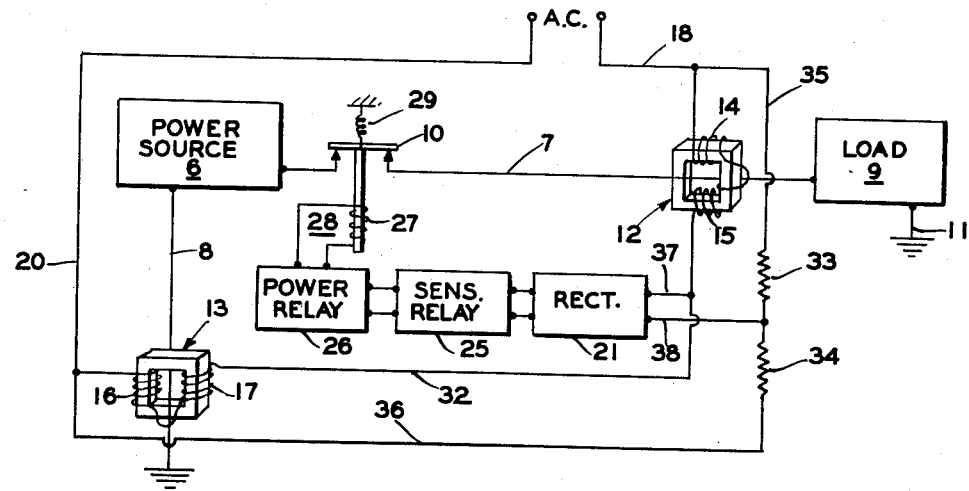
Figure 4 is a block diagram illustrating another embodiment of the invention.

In the embodiment illustrated in Figure 4, the load 9 is connected to the source of D. C. power 6 by the output lines 7 and 8 and switch member 10 as in the previous figures. The inductance 12 is located adjacent to the load 9 and is adapted to surround the conductor 7. The inductance 13 is located adjacent to and is adapted to surround the conductor 8. It is understood, however, that the inductance 13 may be located adjacent to the source 6 and surrounding the line 7 as illustrated in Figure 2.

The reactors 12 and 13 are connected to form one half of a bridge circuit in the following manner. One end of winding 14 of the reactor 12 is connected to one side of the A. C. source by a conductor 18. The windings 14 and 15 of the reactor 12 are connected in series. The opposite end of winding 15 is connected by a conductor 32 to one end of the winding 17 of the reactor 13. The windings 16 and 17 of the reactor 13 are connected in series and the opposite end of the winding 16 is connected by a conductor 20 to the opposite side of the source of A. C. The other side of the bridge circuit is formed by resistors 33 and 34 connected in series. The outer end of the resistor 33 is connected by conductor 35 to the conductor 18 and the outer end of the resistor 34 is connected by conductor 36 to the conductor 20. One input terminal of the rectifier 21 is connected by conductor 37 to the conductor 32 and the other input terminal of the rectifier 21 is connected by conductor 38 to the center point between the resistances 33 and 34. The output of the rectifier 21 is connected to the sensitive relay 25 and upon the output current of the rectifier 21 exceeding a predetermined value, the relay 25 affects the power relay 26 in a manner to cause it to deenergize the winding 27 of the relay 28 thus permitting the switch member 10 to be actuated to an open circuit position under the bias of the spring 29.

In operation, the reactors 12 and 13 form one side of a bridge circuit with the resistors 33 and 34 forming the opposite side. With the current flowing in the lines 7 and 8 being equal, the impedance of the reactors will be equal and the bridge balanced. However, upon a fault occurring on one of the feeders, an unbalance in current flow in the feeders will increase the D. C. bias of the affected reactor by an amount proportional to the unbalance and thereby unbalancing the bridge causing current to flow into the rectifier.

Figure 5:
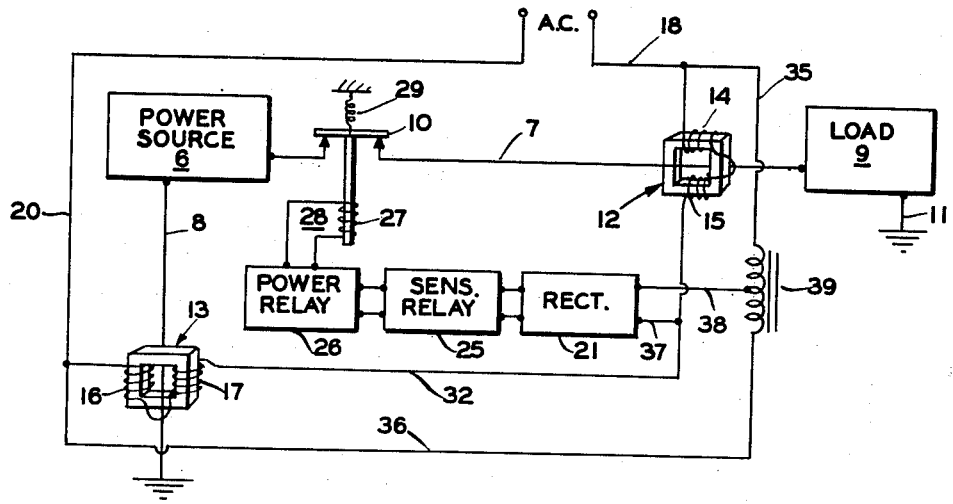
Figure 5 is a block diagram illustrating another embodiment of the invention.

Referring to Figure 5 wherein the embodiment illustrated is somewhat similar to that of Figure 4, a detailed description will be omitted. In Figure 5, a center tapped inductance forms one side of the bridge, replacing the resistors 33 and 34 of Figure 4. The operation is similar to that of Figure 4.

While the reactances in Figures 4 and 5 have been illustrated as having a pair of windings connected in series, it is understood that they could have a single winding without departing from the scope of the invention.

Figure 6:
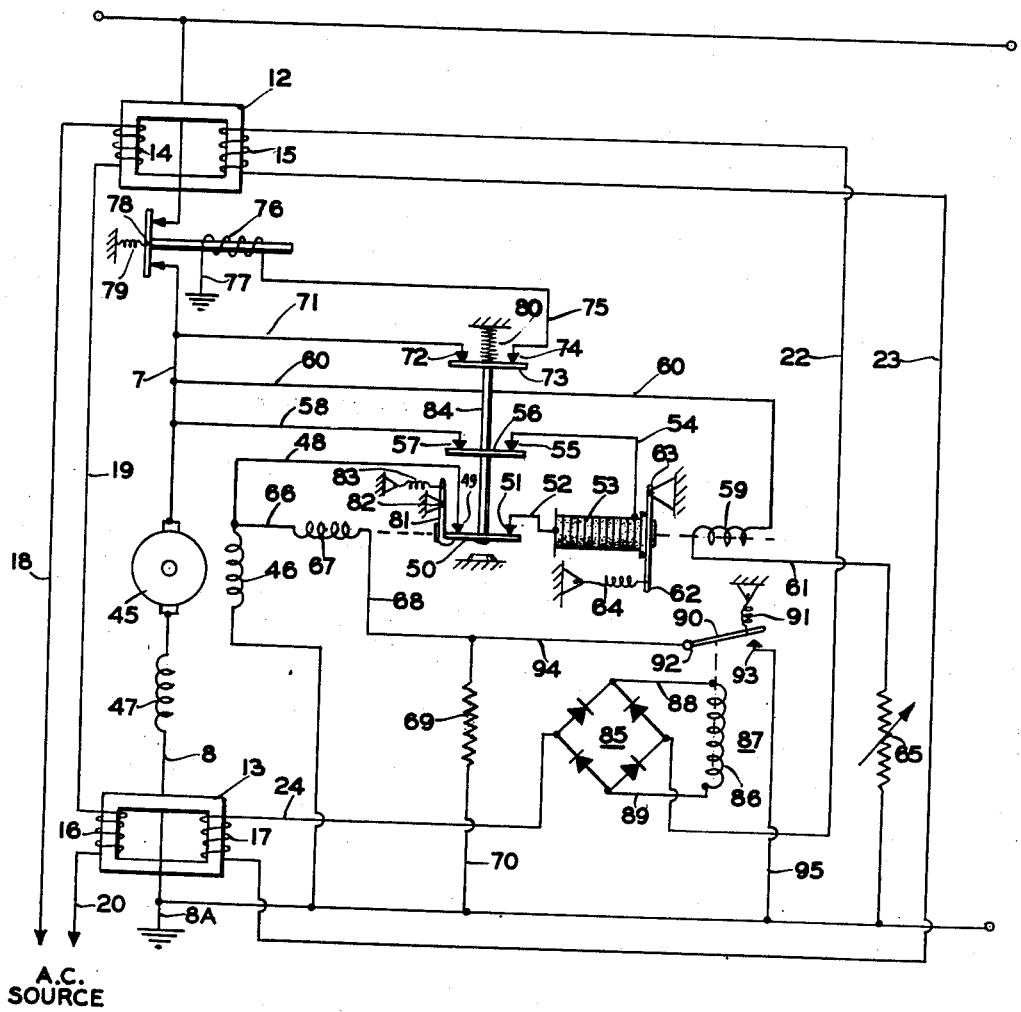
Figure 6 is a schematic diagram illustrating the embodiment shown in Figure 1.

Referring now to Figure 6 wherein the embodiment illustrated in Figure 1 is incorporated in a generator system, there is provided a generator 45 having output lines 7 and 8, field winding 46 and interpole and compensating winding 47. The winding 47 is connected in series with one output terminal of the generator 45 and the output line 8. The field winding 46 is connected at one end to the output line 8 while the opposite end of the field winding 46 is connected by a conductor 48 to one contact 49 which is controlled by a switch member 50 which cooperates with a second switch contact 51. Leading from the switch contact 51 is a conductor 52 which in turn is connected to one end of a variable resistance carbon pile element 53. The other end of the carbon pile element 53 is connected by a conductor 54 to a switch contact 55 controlled by a switch member 56 which cooperates with a second switch contact 57. Leading from the switch contact 57 is a conductor 58 which is connected to the output line 7.

A winding 59 is connected by conductor 60 and 61 across the output lines 7 and 8 and provides electromagnetic means which are so arranged in the carbon pile regulator as to control an armature 62 thereof and thereby the pressure applied to the carbon pile 53. The regulator is shown diagrammatically in the drawing as including the armature 62 pivoted at 63 and exerting a compressive force upon the carbon pile 53 under tension of a spring 64. The spring 64 is arranged so as to balance the pull on the armature 62 by the electromagnet 59 when energized by a line voltage having a predetermined value. A variable resistance 65 inserted in the conductor 61 permits adjustment of the electromagnet 59. The regulator is preferably of a type such as shown in U. S. Patent No. 2,427,805, granted September 23, 1947, to William G. Neild.

Leading from the conductor 48 is a conductor 66 connected to one end of a potential coil 67. The other end of coil 67 is connected by a conductor 68 to one end of a resistor 69. The other end of resistor 69 is connected by a conductor 70 to the output line 8. With the switches 50 and 56 in the closed position as shown, it will be seen that the carbon pile 53 will be connected in series with the field 46 of the generator 45 so as to regulate the voltage across the lines 7 and 8. The line 8 is grounded at 8A.

Leading from the output line 7 is a conductor 71 connected to a switch contact 72 controlled by a switch member 73 which cooperates with a second switch contact 74. The switch contact 74 is connected by a conductor 75 to an electromagnetic winding 76. The winding 76 is grounded at the opposite end by a conductor 77. The winding 76 controls a main line circuit breaker 78 which is biased in a circuit open position by a spring 79.

The switch members 50, 56 and 73 are biased under tension of a spring 80 in a direction for opening the respective circuits controlled thereby but the same are held from opening by a latch member 81 pivoted at 82 under tension of a spring 83 so as to lock the several switch members 50, 56 and 73 in a circuit closing position.

The several switches 50, 56 and 73 are mechanically held by a suitable rod 84. Thus, the switches 50, 56 and 73 are normally held in a circuit closing position by the latch 81. The latch 81 is controlled by the winding 67 which is connected as previously described across the field winding 46 of the generator 45.

The control system as set forth above is described and claimed in applications Serial No. 701,266, filed October 4, 1946, by William F. Fell, now U. S. Patent No. 2,508,665, reissued April 3, 1951, as Re. 23,351, and Serial No. 701,332, filed October 4, 1946, by Robert L. Brown, now U. S. Patent 2,522,601.

The novel feature of the invention is the means for detecting faults and comprises the iron cored inductances 12 and 13 having the respective primary windings 14 and 16, and secondary windings 15 and 17. The primary windings 14 and 16 are connected in series aiding relationship by the conductors 18, 19 and 20 across a source of A. C. (not shown). The secondary windings 15 and 17 are connected in series opposition to a bridge rectifier 85 by conductors 22, 23 and 24. A winding 86 of a relay 87 is connected across the output of the rectifier 85 by conductors 88 and 89. The relay 87 controls a switch member 90 biased in a normally open circuit position by a spring 91. The switch member 90 cooperates with contact members 92 and 93. The contact member 92 is connected by a conductor 94 to the conductor 68 while the contact member 93 is connected to the conductor 70 by a conductor 95.

In operation, when the inductances 12 and 13 are properly balanced, the power output of the rectifier 75 is substantially zero as the secondary windings 15 and 17 are connected in series opposition and one will cancel the other. This condition will hold for wide variations in load as the D. C. flux through the inductances 12 and 13 will increase in substantially the same manner thus maintaining the balance between the opposing secondary windings 15 and 17.

Upon the occurrence of a fault between one of the feeders and ground the D. C. flux through the inductance surrounding the faulted feeder will increase. This causes the primary impedance of the inductance to decrease thus causing a decrease in the excitation voltage across the primary winding thereby decreasing the induced secondary voltage. At the same time, though there has been no change in D. C. flux through the other inductance, due to the series arrangement of the primary windings, the excitation voltage across the primary has increased thereby increasing the induced secondary voltage. This destroys the balance between the secondary windings and provides an input to the rectifier 85, the amount of which depends upon the amount of current through the fault. The rectified output energizes the winding 86 causing the relay 87 to overcome the bias of spring 91 and actuating the switch member 90 into a closed circuit position. The closing of the switch member 90 shunts out the resistance 69 in series with the over-voltage winding 67. This increases the voltage applied to the coil 67 to a value above the predetermined minimum and is sufficient to enable the coil 67 to overcome the bias of the spring 83 to affect the latch member 81 to permit the actuation of the switch members 50, 56 and 73 to open the generator field circuit and also to de-energize the circuit for controlling the main line switch 78.

Although only five embodiments of the invention have been illustrated and described, various changes in the form and relative arrangement of the parts, which will now appear to those skilled in the art, may be made without departing from the scope of the invention.

What is claimed is:

1. A protective system for a direct current generator having positive and negative output lines, a main field winding and a series field winding, comprising relay means for connecting said generator to said output lines, a pair of iron cored inductances, having primary and secondary windings, one of said inductances being positioned around said positive output line and the other of said inductances being positioned around said negative output line, said output lines providing the D. C. excitation for said inductances, a source of alternating current, means for connecting said primary windings in series aiding relationship across said source of alternating current, a bridge rectifier, means for connecting said secondary windings in series opposition relationship across the input of said rectifier, and means for connecting said relay means across the output of said rectifier, said secondaries being responsive to a difference in D. C. excitation of said inductances to produce a current of an amplitude proportional to the difference in said D. C. excitation caused by an unbalance of current flow in said lines to actuate said relay means thereby to disconnect said generator from said lines.

2. A protective system for disconnecting a source of electrical energy from a load circuit upon a fault occurring therein, comprising a source of electrical energy having a pair of output lines, relay means for effecting the connection of said source to said output lines, a first reactor having a core surrounding one of said output lines and responsive to the current flowing therein, a second reactor having a core surrounding the other of said output lines and responsive to the current flowing therein, each of said reactors having a primary winding and a secondary winding, means for connecting said primary windings in series aiding relation and said secondary windings in series opposition relation, a source of alternating current for energizing said primary windings, means including said reactors responsive to an unbalance in current flow in said lines to actuate said relay means to disconnect said source from said lines upon a fault occurring on one of said lines to cause said unbalance.

References Cited in the file of this patent

UNITED STATES PATENTS

| Number | Name | Date |
| --- | --- | --- |
| 458,666 | Short | Sept. 1, 1891 |
| 1,023,264 | McElroy | Apr. 16, 1912 |
| 1,085,309 | Wedmore | Jan. 27, 1914 |
| 1,779,724 | Beard | Oct. 28, 1930 |
| 1,901,628 | Brainard | Mar. 14, 1933 |
| 2,157,810 | Bany | May 9, 1939 |
| 2,494,365 | Sills | Jan. 10, 1950 |
| 2,534,895 | Austin | Dec. 19, 1950 |

FOREIGN PATENTS

| Number | Country | Date |
| --- | --- | --- |
| 619,015 | Great Britain | Mar. 2, 1949 |
| 805,769 | France | Nov. 28, 1936 |